United States Patent [19]
Harrison et al.

[11] Patent Number: 5,778,416
[45] Date of Patent: Jul. 7, 1998

[54] PARALLEL PROCESS ADDRESS GENERATOR AND METHOD

[75] Inventors: Calvin Wayne Harrison; Susan Lynne Gilfeather; John Bartholomew Gehman, Jr., all of Scottsdale, Ariz.

[73] Assignee: Motorola, Inc., Schaumburg, Ill.

[21] Appl. No.: 826,624

[22] Filed: Apr. 3, 1997

Related U.S. Application Data

[63] Continuation of Ser. No. 169,255, Dec. 20, 1993, abandoned.

[51] Int. Cl.$^6$ .................................................. G06F 12/00
[52] U.S. Cl. .................................................. 711/5; 711/217
[58] Field of Search .......................... 399/800; 364/726, 364/255.1; 711/5, 1, 215, 217, 221

[56] References Cited

U.S. PATENT DOCUMENTS

| | | | |
|---|---|---|---|
| 3,731,284 | 5/1973 | Thies | 364/715.011 |
| 3,871,577 | 3/1975 | Avellar et al. | 364/726.02 |
| 4,893,279 | 1/1990 | Rahman et al. | 365/230.03 |
| 4,920,480 | 4/1990 | Murakami et al. | 395/800.36 |
| 4,974,188 | 11/1990 | Dolecek | 364/784.01 |
| 5,012,441 | 4/1991 | Retter | 711/217 |
| 5,029,079 | 7/1991 | Magar et al. | 364/726.02 |
| 5,032,986 | 7/1991 | Pathak et al. | 711/217 |
| 5,045,993 | 9/1991 | Murakami et al. | 395/583 |
| 5,109,497 | 4/1992 | Bolstad et al. | 711/200 |
| 5,224,063 | 6/1993 | Matsunaga | 364/726.02 |
| 5,307,300 | 4/1994 | Komoto et al. | 364/736.01 |
| 5,341,485 | 8/1994 | Hattersley et al. | 711/207 |
| 5,430,667 | 7/1995 | Takano | 364/726.02 |
| 5,450,553 | 9/1995 | Kitagaki et al. | 364/258.1 |
| 5,475,828 | 12/1995 | Goto | 711/158 |

OTHER PUBLICATIONS

Zobel, R.N., "Some Alternative Techniques for Hardware Address Generators for Digital Signal Processors", 1988 IEEE International Symposium on Circuits and Systems, Proceedings (Cat. No. 88CH2458-8), pp. 69-72, vol. 1.

An article entitled "LH9320 DSP Address Generator" from Sharp Data Sheet, (FDS-Rev. A, Sep. 30, 1992).

An article entitled "LH9124 Digital Signal Processor" from Sharp Data Sheet, (Ref. Code SMT90033 Jul. 1992).

An aricle entitled "Frequency Domain Array Processor, A66540A/4K, 16K, 64K, A66540B/4K, 16K, 64K", from Preliminary User's Guide, Revision 3/91(Array Microsystems, 1420 Quial Lake Loop, Colorado Springs, CO 80906).

An article entitled "A 300-MOPS Video Signal Processor with a Parallel Architecture" by Toshihiro Minami, Ryota Kasai, Yamauchi, Yutaka Tashiro, Jun-ichi Takahashi and Shigeru Date, from IEEE Journal of Solid-State Circuits, vol. 26, No. 12, (Dec. 1991).

*Primary Examiner*—Eddie P. Chan
*Assistant Examiner*—Kevin Verbrugge
*Attorney, Agent, or Firm*—Bradley J. Botsch, Sr.

[57] ABSTRACT

A memory linked address generator and method for a complex arithmetic processor executing an algorithm sequence includes memories, a clock for generating a clock cycle, and a decoder for determining position of the complex arithmetic processor within the algorithm sequence. The decoder is coupled to the clock and address pointer generators are coupled to the decoder and to the memories. The address pointer generators generate address pointers within the clock cycle for at least some of the memories in response to the position of the complex arithmetic processor within the algorithm sequence.

5 Claims, 1 Drawing Sheet

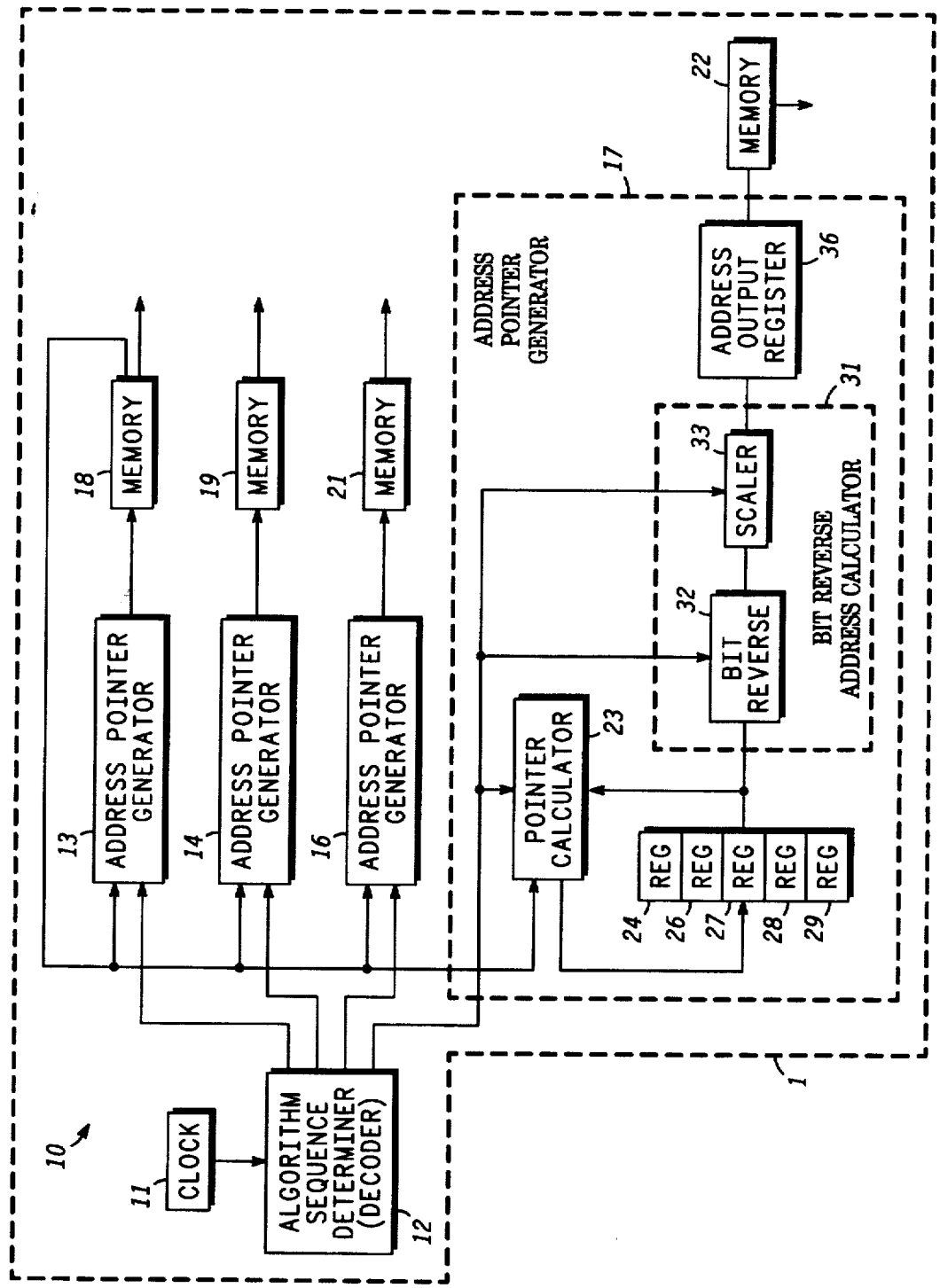

PARALLEL PROCESS ADDRESS GENERATOR AND METHOD

This application is a continuation of prior application Ser. No. 08/169,255 filed Dec. 20, 1993, now abandoned.

FIELD OF THE INVENTION

This invention relates in general to digital signal processing and in particular to parallel memory address generation in such applications.

BACKGROUND OF THE INVENTION

High speed digital signal processing (DSP) in communication system applications require low power implementations of high performance DSP capabilities, especially for hand-held devices. These DSP's must be capable of efficiently performing the spectral analysis and digital filtering required for hand-held spread spectrum communication equipment, high speed modems and all digital radios. These applications require matrix math operations, complex arithmetic operations, Fast Fourier Transform (FFT) calculations, encoding/decoding, searching and sorting. Optimization of the computations require that the address generation mechanisms within the DSP provide the appropriate data sequence to the DSP arithmetic engine at a rate commensurate with the calculation rate. For example, for execution of the complex multiply operation:

$$(x_1+iy_1)(x_2+iy_2)=(x_1x_2-y_1y_2)+i(x_1y_2+y_1x_2)$$

four real multiplications and two real additions are required.

A Complex Arithmetic Processor (CAP) Very Large Scale Integration (VLSI) has been designed to execute a Radix-8 FFT at a throughput rate of one butterfly per 8 instruction cycles. A Radix 8 FFT requires seven complex multiplications, four real multiplications, 24 complex additions, 16 complex memory fetches and 8 complex memory stores per butterfly. What is needed are independent, sophisticated parallel memory address generation processors to control the associated memory fetches and stores.

Typical address generation techniques include using a separate processor from the arithmetic processor for address generation to reduce overall processing time. The address generation processor is typically configurable into one of several addressing modes. The addressing modes determine how the address sequence is to be calculated. Registers used as pointers, offsets, indices or special modifiers (such as modulo or bit reverse) in the address calculations are loaded sequentially. Multiple Sine and Cosine tables used in communication signal processing applications are typically stored in memory to avoid the step size calculation required in a single table.

Typical address generation techniques are not capable of providing the complicated address sequences required for all digital communications applications such as the CAP VLSI, however. The typical address generation techniques do not include the capability to perform multi-level indirect addressing in a single instruction cycle. This capability is required for fast table look-up functions in the Complex Arithmetic Processor.

Typical address generation techniques are also inadequate for calculating the address sequence for a radix 8 FFT fast enough to support the recurring single cycle complex multiplies required for the computation in the Complex Arithmetic Processor. These techniques do not provide for the simultaneous calculation of offset addresses into the compact Sine and Cosine tables. Address register initialization using typical address generation techniques does not allow the parallel loading of predetermined configurations required for minimum overhead radix 8 address generation.

SUMMARY OF THE INVENTION

Accordingly, it is an advantage of the present invention to provide a new and improved method and apparatus for multiple, independent address generation for a minimum of four input data streams and two output data streams in a CAP VLSI. It is a further advantage of the method and apparatus that the subsequent addresses (or address sequence) for each data stream can be calculated within the address generator with sufficient speed (a computational throughput of one complex multiply per instruction) to provide a set of addresses each instruction cycle of the DSP. It is still a further advantage that the method and apparatus allow for low power DSP implementations integrating address generation with memories and an arithmetic engine on a single VLSI device.

To achieve these advantages, a memory linked address generator for a complex arithmetic processor executing an algorithm sequence is contemplated which includes memories, a clock for generating a clock cycle, and a decoder for determining position of the complex arithmetic processor within the algorithm sequence. The decoder is coupled to the clock and address pointer generators are coupled to the decoder and to the memories. The address pointer generators generate address pointers within the clock cycle for at least some of the memories in response to the position of the complex arithmetic processor within the algorithm sequence.

To further achieve these advantages, a method for generating address pointers for memories in a complex arithmetic processor is contemplated which includes the step of determining, by the complex arithmetic processor, position within an algorithm sequence. Based on the position, the complex arithmetic processor determines address pointers for each of at least some of the memories within one clock cycle.

The above and other features and advantages of the present invention will be better understood from the following detailed description taken in conjunction with the accompanying drawings.

BRIEF DESCRIPTION OF THE DRAWING

In the single FIGURE, there is shown a schematic of a parallel address generator method and apparatus in accordance with a preferred embodiment of the invention.

DETAILED DESCRIPTION OF THE DRAWING

Generally, the present invention provides a method and apparatus for generating multiple address pointers within a given clock cycle. This may be accomplished by first determining the position within an executing algorithm, and based on this position, update the address pointers with the correct values. The updated address pointers are either calculated based on previous values or are fixed numbers that are simultaneously loaded into the pointer locations. The data already stored in memory that is accessed by the pointers can then be used as operands for arithmetic functions, or can be used to update address pointers to other memory locations. Address pointers are also used to store results in output memory. Some algorithms require bit reversed addresses to retrieve data from memory. This is accomplished by first retrieving an address pointer and bit reversing this pointer. Based upon the number of bits needed for the memory address, the address pointer is then scaled the appropriate amount to obtain the desired address. The decision to bit reverse comes from the algorithm sequence determiner.

The present invention can be more fully understood with reference to the FIGURE. The FIGURE illustrates a complex arithmetic processor 1, including a memory linked address generator 10 having a clock 11, which generates a predetermined number of clock cycles. The clock 11 is coupled to and provides the clock cycles to an algorithm sequence determiner 12, which determines the position within an algorithm sequence. Based upon this position, the address pointer generators (APG) 13–17 are updated accordingly. These address pointer generators point to their corresponding memories 18–22 which store or retrieve the relevant data needed to complete the algorithm sequence. These memories can also contain values that are used to update the address pointer generators directly in hardware. Hence, the name memory linked address generators. Although the FIGURE shows only four APGs 13–17, four memories 18–22, and five registers 24–29 inside the address pointer generator 17, the invention is scalable.

Address pointer generators 13–17 include a pointer calculator 23, which calculates pointers stored in registers 24–29. If instructed by the algorithm sequence determiner, the pointer calculator can update all the pointers stored in the registers 24–29 in one clock cycle. Any one of the pointers stored in these registers can be used to address memory and to update itself using the pointer calculator. If bit reversed addressing is required, the output of any given register can be bit reversed using the bit reverse address calculator 31. The pointer enters the bit reverse address calculator and is first bit reversed using the bit reverse block 32. Then, based upon the number of bits needed for the memory address, the bit reversed number is scaled the appropriate amount using the scaler 33. The result is a bit reversed address which is used to store or retrieve the desired data in memory. In either the normal or bit reversed addressing mode, the address is stored in address output register 36 to be used on the following clock cycle to address memory.

Memory link address generator 10 provides multiple address pointers for memories 18–22 within a single clock cycle. A new instruction is fetched every clock cycle so that new memory locations can be accessed every clock cycle. There is a three stage pipeline delay from the instruction fetch to a memory access. In stage one the instruction is fetched and the instruction fields are latched into the appropriate decode registers in the algorithm sequence determiner 12. In stage two the new address pointer is calculated and latched into the address output register 36 and any of the address pointer registers 24–29. In stage three the address in output register 36 is used to access memory.

The algorithm sequence determiner 12 fetches an instruction which it partitions into the number of fields required to individually control each memory 18–22. The bit fields are latched into decode registers assigned to a particular memory. The output of the decode register for memory 22 is locally decoded at the APG 17 connected to that memory. The pointer calculator 23 receives the bit field from the algorithm sequence determiner 12 and performs the calculation according to the number that is in the bit field. Since each APG is assigned it's own bit field from the instruction, multiple address pointer generators are programmed simultaneously within one clock cycle. Calculations performed by the pointer calculator 23 include the operations listed below.

1. No registers updated.
2. Load one register with data from the instruction.
3. Load all registers with data stored in hardware.
4. Load all registers with data based on the sum of a pair of registers.
5. Load a register with the sum of data stored in that register and a number stored in hardware. Output the result on the current clock cycle.
6. Load a register with the sum of data stored in that register and a number stored in another register. Output the result on the current clock cycle.
7. Load a register with the sum of data stored in another registers and the contents of another memory. Output the result on the current clock cycle.
8. Load a register with the sum of data stored in two other registers.
9. Output the contents of a pointer register.
10. Output the contents of a pointer register and then update it with the sum of data stored in that register and a number stored in hardware.
11. Output the contents of a pointer register and then update it with the sum of data stored in that register and a number stored in another register.
12. Output the contents of a pointer register and then update it with the sum of data stored in that register and the contents of another memory.
13. Output the contents of a pointer register bit reversed according to the maximum size of the pointer. Operations 5–7 and 9–12 can be performed in conjunction with the bit reversal operation.

There are many applications for algorithms with multiple pointers. Filtering requires a moving base pointer about which other address pointers are calculated. Matrix applications require row and column pointers. The Fast Fourier Transform (FFT) uses multiple pointers to access unit vectors that rotate complex data samples. A Radix 8 FFT uses sets of seven different unit vectors which have angles that are multiples of a base angle. This invention allows a pointer to a new base angle and six multiples of the base angle to be computed in one clock cycle. Computing efficiency is gained when all of the pointers can be initialized in one instruction. For example, a Radix 8 Butterfly calculation requires 26 pointers in order to execute the butterfly in eight instructions. During certain portions of the calculation up to 18 pointers need to be updated in one instruction. In particular, a critical area is in accessing unit vectors which reside in a complex memory space. The complex memory space consists of two memories. One is loaded with a SIN table, the other a COS table. In each Radix 8 butterfly, a new unit vector is accessed every instruction for seven instructions. On the eighth instruction, the seven new unit vector pointers may be computed. If the base pointer is N, the unit vector pointer set for radix 8 consists of N, 2N, 3N, 4N, 5N, 6N and 7N. The following table shows the contents of the pointer registers if the base angle is 5.625 degrees and the memories contains 1024 point SIN and COS tables.

| Register Name | Register Value | Memory 18 | Memory 19 |
| --- | --- | --- | --- |
| R1 | 16 | COS 5.625 | SIN 5.625 |
| R2 | 32 | COS 11.25 | SIN 11.25 |
| R3 | 48 | COS 16.875 | SIN 16.875 |
| R4 | 64 | COS 22.5 | SIN 22.5 |

| Register Name | Register Value | Memory 18 | Memory 19 |
|---|---|---|---|
| R5 | 80 | COS 28.125 | SIN 28.125 |
| R6 | 96 | COS 33.75 | SIN 33.75 |
| R7 | 112 | COS 39.375 | SIN 39.375 |

During a new unit vector update, the following calculations take place in both memory address pointer calculators. Five adders are required in each pointer calculator.

R1+16>R1 add
(R1 +16)*2>R2 wired shift
(R1+16)*2+(R1+16)>R3 wired shift, add
(R1+16)*4>R4 wired shift
(R1+16)*4+(R1+16)>R5 wired shift, add
(R1+16)*4+(R1+16)*2>R6 wired shifts, add
(R1+16)*4+(R1+16)*2+(R1+16)>R7 result to R6, add In addition to the special case of unit vector updates, the pointer registers can be initialized in one clock cycle to fixed values which are common to most algorithms. The most common would be the base address of RAM or ROM blocks which would be the starting point of data. In pipelined systems the output pointers lag the input pointers by the pipeline delay. In order to contain all of the calculations within a loop it may be necessary to initialize the output pointers to a location before the actual starting point.

In some applications such as data compression, data correction, cryptography, and matrix math, it is difficult to compute the next address quickly because the addressing sequence is non-linear or even random. In some of these cases addresses can be created by sequencing through a table of pointers. This is commonly called a linked list. In the case of encryption, the sequence through the table of pointers is random. Random data may come from an external device called a key generator. This invention creates the required linkage, in hardware, by allowing data from a memory to directly drive the address pointer generator of another memory. These computations are defined as operations 7 and 12 in the above list. Normally data would have to be fetched and stored to a general purpose register in one instruction, transferred to an address generator register in the next instruction and then used to generate a new address in the last instruction. This invention has a direct data path from memory to the address generator input allowing a new address to be generated each instruction based on data from another memory.

While performing an FFT algorithm an array of input data is sorted into a different output sequence. The data can be put back in the correct order if bit reversed addressing is used. The FFT can be performed with the inputs reversed and the outputs in order, or the inputs in order and the outputs reversed. Examples of bit reversing are shown below.

| Address | Bit Reversed Address |
|---|---|
| 01111 | 11110 |
| 10111 | 11101 |
| 00100 | 00100 |
| 00000 | 00000 |
| 11111 | 11111 |
| 0000001 | 1000000 |
| 1010101 | 1010101 |

The main computational consideration for doing bit reversing is the address range of the data that is being reversed. An array of 1024 points requires 10 bits to be reversed while an array of 64 points requires 6 bits to be reversed. Because most applications only require a linear sequence of bit reversed addresses, they are created by adding the Most Significant Bit (MSB) of the required range to the last generated address and performing a reverse carry. This only works if the last address is a bit reversed address and the required output is the next one in the sequence.

| NEXT DECIMAL | NEXT BINARY | NEXT BIT REVERSED BINARY | |
|---|---|---|---|
| 19 | 10011 | 11001 | |
| +1 | 00001 | +10000 | reverse carry |
| 20 | 10100 | 00101 | |

This invention allows a bit reversed address to be output from a pointer without modifying the pointer. It can produce the bit reversed result of Address+N, where N is any integer. It is not restricted to Previous Address+1. This feature is useful in large pipelined arithmetic engines where the data may need to be fetched out of sequence to balance the computational load. Bit reversal is implemented by providing a data path which physically reverses all of the address bits available by means of circuit tracks. If a smaller address range is required the data is shifted to the right.

| NORMAL | BIT REVERSED | |
|---|---|---|
| 0000000011 | 1100000000 | Address Range 0–1023 |
| | 0011000000 | Address Range 0–255 Right shift 2 bits |

Thus, a parallel processor address generator and method has been described which overcomes specific problems and accomplishes certain advantages relative to prior art methods and mechanisms. The present invention provides a method and apparatus for generating multiple address pointers within a given clock cycle. The address generation device and method support multiple, independent address generation for a minimum of four input data streams and two output data streams. The subsequent addresses (or address sequence) for each data stream can be calculated within the address generator with sufficient speed to provide a set of addresses each instruction cycle of the DSP. Low power implementations can be realized, with address generation integrated with memories and an arithmetic engine on a single VLSI device.

Thus, there has also been provided, in accordance with an embodiment of the invention, a parallel processor address generator and method that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A memory linked address generator for a complex arithmetic processor executing an algorithm sequence, the memory linked address generator comprising:

a) a plurality of memories;

b) a clock for generating a clock cycle;

c) a decoder for determining position of the complex arithmetic processor within the algorithm sequence, the decoder coupled to the clock; and d) a plurality of address pointer generators for generating address pointers within the clock cycle for at least some of the plurality of memories in response to the position within the algorithm sequence of the complex arithmetic processor, the plurality of address pointer generators coupled to the decoder and to the plurality of memories wherein an output of at least one of said plurality of memories is coupled to at least one of said plurality of address pointer generators corresponding to another one of said plurality of memories thereby allowing data from said at least one of said plurality of memories to directly drive said at least one of said plurality of address pointer generators corresponding to said another one of said plurality of memories, each of the plurality of address pointer generators including a bit reverse address calculator for bit reversing at least one address pointer to produce a bit reversed address pointer without modifying said at least one address pointer.

2. A memory linked address generator as claimed in claim 1, wherein the clock generates a predetermined number of subsequent clock cycles and the plurality of address pointer generators determine subsequent address pointers for the at least some of the plurality of memories for the predetermined number of subsequent clock cycles.

3. A memory linked address generator as claimed in claim 2, wherein each of the plurality of address pointer generators comprises:
   a) a plurality of registers storing at least one address pointer; and
   b) a pointer calculator for calculating a bit reversed address without sequential address pointer indexing, the pointer calculator coupled to the plurality of registers.

4. A memory linked address generator as claimed in claim 3, wherein the bit reverse address calculator comprises a bit reverser for bit reversing the at least one address pointer, the bit reverser coupled to the plurality of registers and to the pointer calculator.

5. A memory linked address generator as claimed in claim 4, wherein the bit reverse address calculator further comprises a scaler for scaling the bit reversed address pointer to obtain the bit reversed address, the scaler coupled to the bit reverser.

* * * * *